United States Patent [19]

Orr

[11] 3,787,098
[45] Jan. 22, 1974

[54] TRACK LINK WITH ECCENTRIC SEAL COUNTERBORE

[75] Inventor: Bobby J. Orr, Springfield, Ill.

[73] Assignee: Allis-Chalmers Corporation, Milwaukee, Wis.

[22] Filed: Nov. 16, 1972

[21] Appl. No.: 307,056

[52] U.S. Cl. .................. 305/11, 277/177, 277/174, 308/36.1
[51] Int. Cl. ............................................. B62d 55/18
[58] Field of Search... 305/11, 14, 58, 42; 308/36.1; 277/174, 177, 212 F

[56] References Cited
UNITED STATES PATENTS

| | | | |
|---|---|---|---|
| 1,063,493 | 6/1913 | Allen | 305/58 X |
| 2,430,573 | 11/1947 | Krotz | 305/59 X |
| 3,390,922 | 7/1968 | Reinsma | 305/11 |

Primary Examiner—Richard J. Johnson
Attorney, Agent, or Firm—Charles L. Schwab; Robert B. Benson; Kenneth C. McKivett

[57] ABSTRACT

The counterbore of the side bar of an endless track link is formed in eccentric relation to the pin in such a manner that as the usual pin and bushing wear occurs, the eccentricity is reduced. This construction allows the radial seal between the counterbore and bushing to be effective over a greater portion of the wear life of the pin and bushing connection.

4 Claims, 2 Drawing Figures

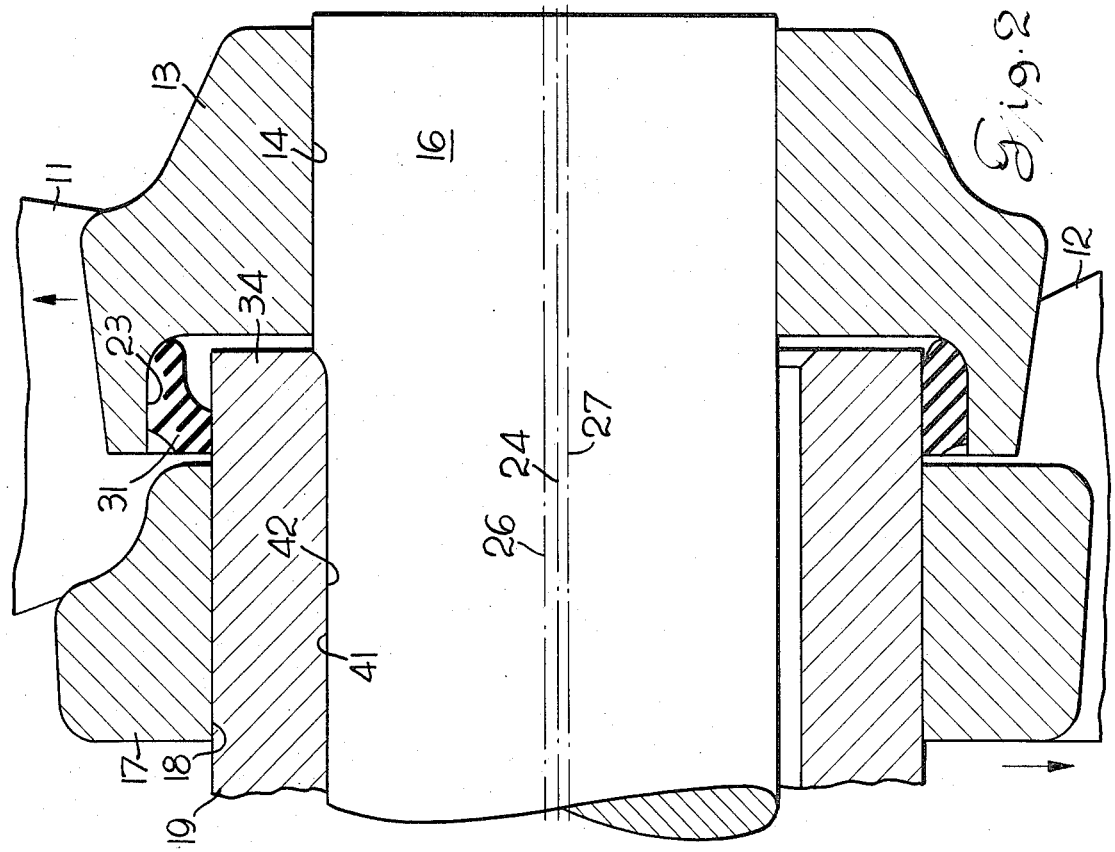
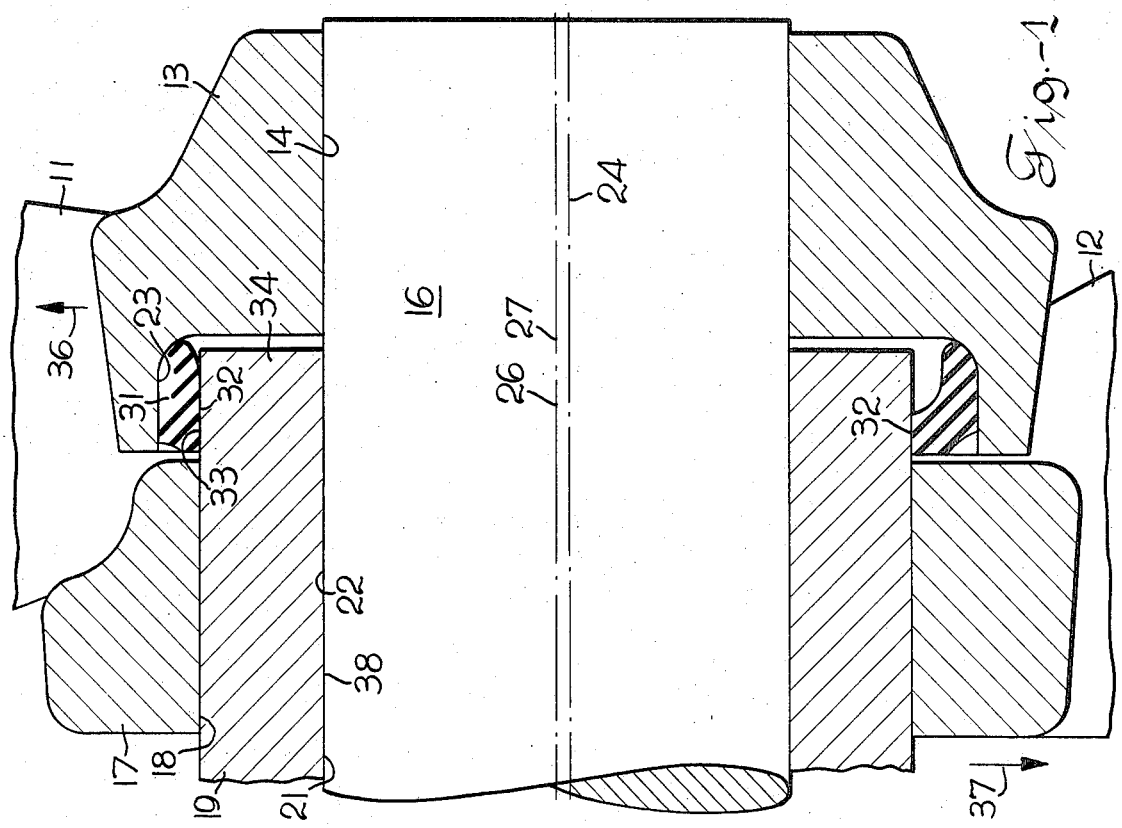

3,787,098

TRACK LINK WITH ECCENTRIC SEAL COUNTERBORE

BACKGROUND OF THE INVENTION

Various track sealing arrangements have been proposed and used by crawler tractor manufacturers and others. While improved track life has been achieved in some instances, there is still a need for an inexpensive yet effective sealing arrangement for endless track. Even though a track is sealed, some wear of the pin and bushing occurs. In a track using radial type seals, this wear gives rise to eccentricity between the seal and the part sealed. Although a flexible radial seal will accommodate some eccentricity, as the wear continues the eccentricity will become sufficiently great to cause the seal to lose its effectiveness.

BRIEF DESCRIPTION OF THE INVENTION

The useful life of a radial track seal is extended by so locating the seal as to compensate for eccentricity caused by usual pin to bushing clearance plus pin to bushing wear. This is achieved by mounting the seal in the side bar on an axis spaced from the pin axis. Although the seal is initially deformed by this eccentric relation to the pin and bushing, as a first stage of wear occurs, the seal deformation is reduced; then as a second, final stage of wear occurs the seal eccentrically deforms in the opposite direction to accommodate its eccentric relationship with the bushing sealing surface.

DESCRIPTION OF THE DRAWINGS

In the drawings,

FIG. 1 shows a track link joint incorporating the present invention prior to any substantial wear thereof and FIG. 2 shows the same joint after substantial pin to bushing wear has occurred.

DETAILED DESCRIPTION OF THE INVENTION

Referring to FIG. 1 of the drawing there is illustrated a pair of adjoining side bars 11, 12 of a link of an endless track for a crawler tractor. The pin boss end 13 of the side bar 11 has a pin bore 14 into which a pin 16 is press fit. The laterally adjacent and longitudinally overlapping end 17 of the side bar 12 has a bushing bore 18 into which a cylindrical bushing 19 is press fit. The inner diameter cylindrical bearing surface 21 of the bushing 19 has a loose fit with the cylindrical bearing surface 22 of the pin 16, whereby the pivot structure comprised of the side bar 11 and the pin 16 pivots freely on the pivot structure comprised of the side bar 12 and the bushing 19. The pin boss end 13 of the side bar 11 includes an annular seal receiving portion in the form of a counterbore 23 formed therein on an axis 24 in spaced, parallel relation to the axes 26, 27 of the pin 16 and the bushing 19, respectively. The axes 26, 27 are represented by a single line in FIG. 1 because of the substantially coaxial relationship of the pin and bushing prior to wear thereof.

The eccentrically formed counterbore 23 receives a radial seal 31 which assumes a radially flattened condition on one side of bushing and a less deformed shape on the other side, this being clearly illustrated in FIG. 1. A radially inner cylindrical sealing face 32 of the flexible annular seal 31 is in radial sealing contact with a cylindrical sealing surface 33 of an axially outer end 34 of the bushing which projects beyond the side bar 17 and into the counterbore 23, the latter being of a substantially larger diameter than the bushing. As shown in the lower part of FIG. 1, the seal is slightly compressed in its radial dimension on the side of the pin 16 and bushing 19 in the direction in which the counterbore 23 is eccentric from the pin 16 and bushing 19. As shown in the upper part of FIG. 1, the annular flexible seal 31 is radially deformed to a substantially reduced radial dimension. In the flexed condition of the seal 31 illustrated in FIG. 1, the eccentricity between the inner and outer diameters thereof is not so great that the seal loses its effectiveness as a sealing component.

During operation of the crawler tractor on which the track components are used, the driving sprocket, not shown, will exert a pulling force on the track causing forces in the directions of arrows 36 and 37 to be exerted on side bars 11 and 12, respectively. During operation of the track the greatest wear will occur along the contact line 38 which is the line of greatest stress loading. As wear occurs this line becomes an area of high stress contact between the pin 16 and the bushing 19. As wear occurs the axis 27 of the bushing moves from an eccentric position on one longitudinal side of the axis 24 of the counterbore 23 to an eccentric position on the other longitudinal side of the counterbore axis 24, as shown in FIG. 2.

In FIG. 2 it will be seen that considerable wear has occurred on the pin and the bushing on their respective high stress contact surfaces 41, 42. This results in the side bar 12 and its bushing 19 moving longitudinally in relation to the side bar 11. The axis 27 of the outer diameter of the bushing 19 has shifted to the opposite side of the counterbore axis 24 and in this condition of wear of the pin and the bushing, the seal flexes to the condition shown, in which condition it still retains its sealing capability. In the worn condition of pin 16 its effective pivot axis is spaced below its original axis 26. In other words the eccentricity between the counterbore 23 and pin is reduced as pin wear occurs.

By providing an eccentric counterbore 23, the seal 31 is effective during approximately twice the pin and bushing wear life as compared to the same seal used in the usual prior art construction wherein the counterbore is formed coaxial with the pin. By mounting the seal 31 on side bar 11 in eccentric relation to the annular sealing surface 33, the radial dimension of the seal 31 at the radial side thereof shown at the upper part of FIG. 1 is less than its radial dimension at its opposite radial side (as shown in the lower part of FIG. 1). As either or both of the bearing surfaces 21, 22 wear the radial dimension of the seal at its one radial side will increase as in shown in the upper part of FIG. 2.

The embodiments of the invention in which an exclusive property or privilege is claimed are defined as follows:

1. A pivot structure for an endless link belt having a cylindrical bearing surface tending to wear on one side of its axis and an annular seal receiving portion formed in eccentric relation to said bearing surface whereby as the latter wears eccentricity is reduced.

2. The invention of claim 1 wherein said pivot structure comprises the side bar and pin for an endless track, wherein said pin presents said bearing surface and wherein said seal receiving portion comprises a counterbore in said bar.

3. In an endless belt of the type having adjoining links interconnected by an annular bushing secured to a side bar of one link and an annular pivot pin secured to the side bar of the adjoining link, the combination comprising:

an annular recess in the side bar to which said pin is secured, the axis of said recess being spaced from the axis of said pin in the direction away from the side of said pin receiving the greatest wear during use, an annular end part on said bushing extending into said recess, and an annular seal in said recess having a radially facing sealing surface in sealing engagement with said annular end part.

4. In an endless belt of the type having pivotally interconnected pivot structures with mating annular bearing surfaces, the combination comprising:

an annular sealing surface on one of said structures, and an annular seal mounted on the other of said structures in eccentric relation to said annular sealing surface whereby the radial dimension of said seal at one radial side thereof is less than the other side when the belt is new and the radial dimension at said one radial side increases as one said bearing surfaces wear.

* * * * *